United States Patent
Karanje et al.

(10) Patent No.: US 12,141,014 B2
(45) Date of Patent: Nov. 12, 2024

(54) TECHNIQUES FOR SLEEP MANAGEMENT IN COMPUTER SYSTEM

(71) Applicant: INTEL CORPORATION, Santa Clara, CA (US)

(72) Inventors: Kedar J. Karanje, Mysore (IN); Vinay Kumar, Bangalore (IN); Sajal Kumar Das, Bangalore (IN)

(73) Assignee: Intel Corporation, Santa Clara, CA (US)

(*) Notice: Subject to any disclaimer, the term of this patent is extended or adjusted under 35 U.S.C. 154(b) by 355 days.

(21) Appl. No.: 17/405,915

(22) Filed: Aug. 18, 2021

(65) Prior Publication Data
US 2022/0057854 A1   Feb. 24, 2022

(30) Foreign Application Priority Data

Aug. 19, 2020 (IN) .............................. 202041035701

(51) Int. Cl.
| | | |
|---|---|---|
| *G06F 1/3234* | (2019.01) | |
| *G06F 1/3206* | (2019.01) | |
| *H04B 17/318* | (2015.01) | |
| *H04W 4/80* | (2018.01) | |

(52) U.S. Cl.
CPC .......... *G06F 1/3234* (2013.01); *G06F 1/3206* (2013.01); *H04B 17/318* (2015.01); *H04W 4/80* (2018.02)

(58) Field of Classification Search
CPC ... G06F 1/3234; G06F 1/3206; H04B 17/318; H04W 4/80
See application file for complete search history.

(56) References Cited

U.S. PATENT DOCUMENTS

| | | |
|---|---|---|
| 2004/0107370 A1 | 6/2004 | Mosley |
| 2006/0149975 A1 | 7/2006 | Rotem et al. |
| 2008/0104425 A1 | 5/2008 | Gunther et al. |
| 2008/0136397 A1 | 6/2008 | Gunther et al. |
| 2011/0043227 A1* | 2/2011 | Pance ............... H03K 17/962 324/681 |
| 2011/0154081 A1 | 6/2011 | Allarey |
| 2011/0179295 A1 | 7/2011 | Jahagirdar et al. |
| 2012/0040623 A1* | 2/2012 | Liu .................. H04W 24/00 455/67.13 |
| 2012/0166844 A1 | 6/2012 | Morgan et al. |
| 2018/0359706 A1* | 12/2018 | Ding ................ H04B 17/318 |
| 2019/0373058 A1* | 12/2019 | De Almeida Forjaz de Lacerda ........... H04L 67/1074 |

* cited by examiner

*Primary Examiner* — Gary Collins
(74) *Attorney, Agent, or Firm* — Nicholson De Vos Webster & Elliott LLP (57) ABSTRACT

Embodiments herein describe a mechanism that puts all the wake sources except a master wake source in low power state (e.g., sleep state) to reduce the overall sleep state power consumption. A Bluetooth Low Energy (BT LE) device is used as master wake source, which scans the presence of a user, and if the user (e.g., mobile device with specific media access control (MAC) address) is in the vicinity or approaching towards the system, the wake sources and memory are made active again. Other embodiments may be described and claimed.

25 Claims, 4 Drawing Sheets

TECHNIQUES FOR SLEEP MANAGEMENT IN COMPUTER SYSTEM

RELATED APPLICATION

The present application claims priority to Indian Provisional Patent Application No. 202041035701, which was filed Aug. 19, 2020, and is hereby incorporated by reference herein.

FIELD

The present application generally relates to the field of electronic circuits and, more specifically, to sleep management in electronic circuits and associated apparatuses, systems, and methods.

BACKGROUND

Delivering higher performance while consuming minimal power continues to be the most challenging part in a portable electronic device. Continuous technology advancements demand for running delay sensitive, power voracious complex applications is always growing, thereby posing a problem in prolonging battery life. Today's computing devices host several applications and include many user interactive components/devices to drive such applications. Some components, such as a fingerprint sensor, touchpad, etc., need to be in a powered on state all the time to be ready to respond to user activity. The list of such devices that await user interaction is forever growing, and with these devices requiring to be powered on, it consumes a significant amount of energy, even when the device is in a sleep state.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Today almost all operating systems follow the Advanced Configuration & Power Interface (ACPI) standard in some form or another. ACPI is a standard that enables an operating system to configure a computer's subsystems and perform power management for the same. This may help put subsystems that are not in use to a lower power mode. As part of the standard, ACPI defines power states for all the sub-modules of a computer system from the SoC, Memory, Devices, Buses, etc. The lowest power states are called sleep states, the ACPI system sleep states (low power states) range from S1 to S5 with decreasing power and increasing latency. A computer system may be configured to wake-up from these sleep states to full powered-on state by various triggers. The devices that generate this trigger are called wake-sources. A typical system may configure devices such as the power button, keyboard, touchpad, etc, as wake-sources.

The currently available sleep state power optimizations keep all the valid wake sources (e.g., touchpad, keyboard, power button, fingerprint sensor, digital signal processor (DSP), etc.) powered on and also retain memory contents, thereby consuming power although the user may interact with only one of them. These wake sources remain active during the device (e.g. laptop) sleep stage (considering wake trigger could come from any source). So, each of these consumes power. Also, the memory (e.g., double-data rate (DDR) memory) refreshing remains ON to save memory content that consumes power.

To provide always connected personal computer (ACPC) experience, 4G/5G cellular modems and WiFi modems are housed inside the client system, which periodically syncs up with the network even in the device sleep state to keep the system up-to-date with latest network information. This periodic sync up leads to extra power consumption, especially in a situation where user is not around.

Various embodiments describe a mechanism that puts all the wake sources except a master wake source in the sleep state to reduce the overall sleep state power consumption. In some embodiments, a Bluetooth (BT) Low Energy (LE) device is used as the master wake source, which scans the presence of a user (e.g., based on a mobile device with a specific medium access control (MAC) address), and if the user is in the vicinity or approaching towards the system, the wake sources and memory are made active again. This may also trigger the cellular and/or WiFi modem for wake-up and quick sync up with the network for updating network information (e.g., the latest email or other message and/or other information from the internet). In accordance with various embodiments herein, any wake source may be configured as a master wake source. Various embodiments are described herein with reference to BT LE as master wake source because it is available on a system-on-chip (SoC).

The time taken by the user to reach the system is sufficient to resume the wake sources, modems, and memory and bring them to active state. As such, the scheme of various embodiments does not impact responsiveness of the system. For example, there is no expected perceivable latency despite suspending transactions to memory and considering that the resume process is started much before user reaches the system. Hence, standby state power consumption is reduced significantly. The scheme of various embodiments creates a staggered method of waking up the system, thereby saving power on the wake sources and memory.

There are many technical effects of the various embodiments. For example, the system power consumption in sleep state is reduced. Table 1 summarizes power savings for small and big processor cores in sleep states.

TABLE 1

| Small Core | | | Big Core | | |
|---|---|---|---|---|---|
| Power Domain | Sleep State(S0ix) | Quasi-Sleep | Power Domain | Sleep State(S0ix) | Quasi-Sleep |
| SoC | 23 | 23 | Soc | 39 | 39 |
| Memory (LPDDR) | 12 | 2 | Memory (LPDDR) | 12 | 2 |
| EC + TPM | 10 | 10 | EC + TPM | 10 | 10 |
| Wifi | 2 | 0 | Wifi | 2 | 0 |
| Audio | 2 | 0 | Audio | 2 | 0 |
| Storage | 2 | 0 | Storage | 2 | 0 |
| wake sources: fingerprint sensor, TouchScreen, keyboard, Power button, usb & BT HID, RTC, Ethernet | 5 | 2 | wake sources: fingerprint sensor, TouchScreen, keyboard, Power button, usb & BT HID, RTC, Ethernet | 5 | 2 |
| VR Loss | 25 | 15 | VR Loss | 31 | 21 |
| Total | 81 | 52 | Total | 103 | 74 |

Table 1 shows that in one example, for small core there is a 35.80% power reduction while for big core, there is about 28.15% power reduction in sleep mode. For a typical use case of 42 watt-hour (WHr) battery, the scheme of various embodiments increases the Modern Standby (e.g., S0ix) time. For example, for small core, the Modern Standby (e.g., S0ix) time increases from 21.6 days to 33.7 days of standby time, and for big core, the Modern Standby (e.g., S0ix) time from 17 days to 23.6 days of standby time.

The scheme of various embodiments detects when the user approaches towards the laptop and brings all the wake sources to active, so the typical response time is improved. Apart from waking up the other wake sources (while the master source remains in wake state), this intermediate time (e.g., user in range to user reaching at laptop) is used by the system to sync up for various other purposes, such as email sync, bringing the program from main memory to primary memory/cache memory, etc. This leads to better system response and saving power.

The scheme of various embodiments detects when the user approaches towards the device, so during the time when the user is not around the dynamic random access memory (DRAM) memory may be switched off by offloading the program/data to the non-volatile memory in the system. This saves the energy for DRAM refreshment. Once the scheme detects that the user is approaching towards the system, then the device downloads the program/data to DRAM memory again. The time taken for downloading the code/program may be less than the time taken by the user from the point where his/her presence is detected to point where he/she reaches the device.

The scheme of various embodiments allows systems to use DDR memory instead of more expensive low power DDR (LPDDR) alternative to save power. Power is saved because all wake sources may not have to be in the active state and waste energy. Other technical effects will be evident from the various figures and embodiments.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—e.g. scaling down, or scaling up respectively) of a signal frequency relative to another parameter, for example, power supply level. The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals e.g., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

Figure 1:
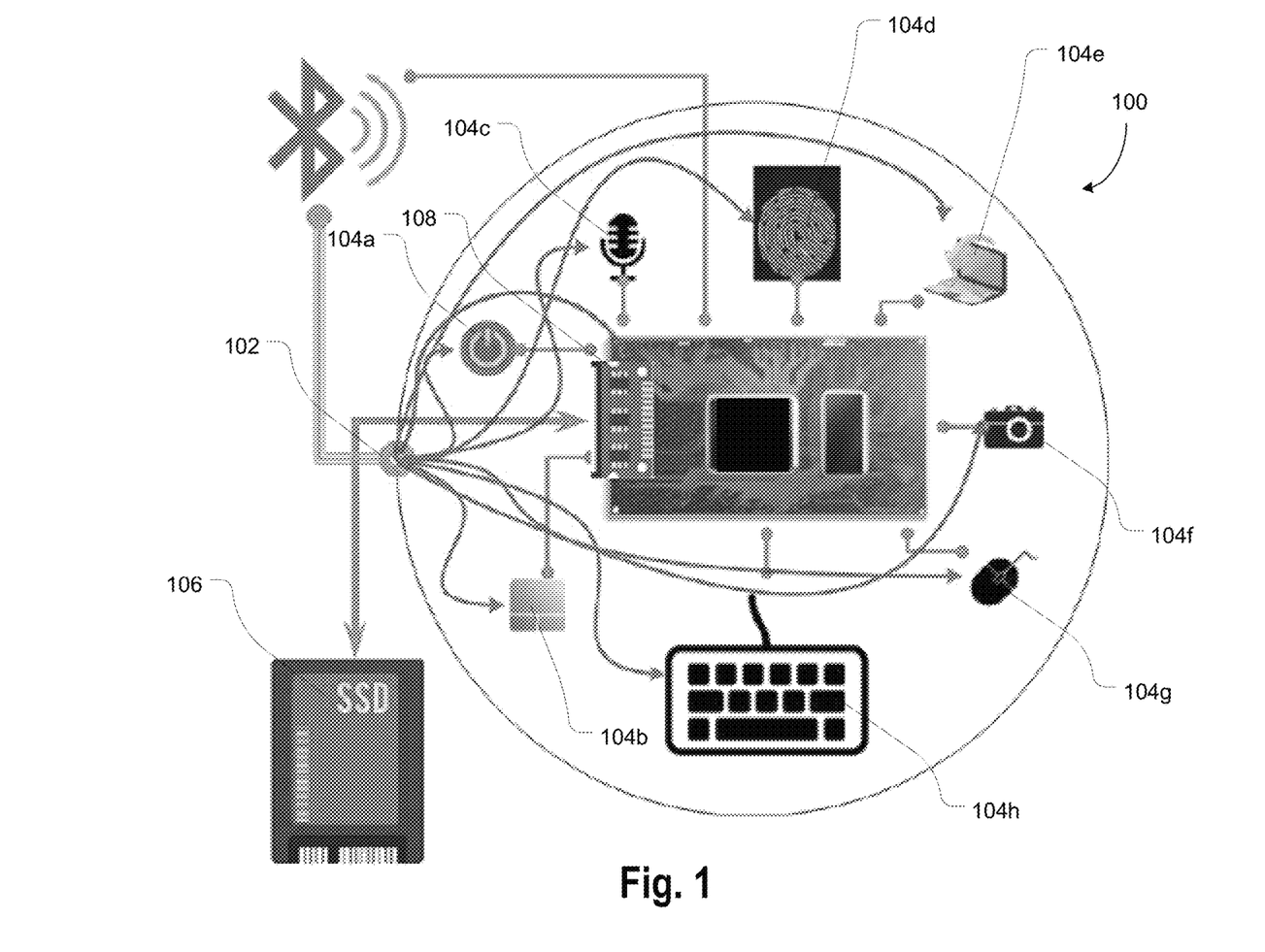
FIG. 1 illustrates master wake source for controlling other wake sources in a system, in accordance with some embodiments.

FIG. 1 illustrates a system 100 comprising a master wake source 102 for controlling other wake sources 104a-h in the system 100, in accordance with some embodiments. For example, as shown master wake source 102 may be a Bluetooth Low Energy (BT LE) device, and the other wake sources 104a-h may include one or more of a power button 104a, a touchpad 104b, a microphone 104c, a fingerprint sensor 104d, an open/close sensor 104e to detect when the a cover of the device is opened, a camera 104f, a mouse 104g, and/or a keyboard 104h. It will be apparent that another master wake source 102 and/or other wake sources 104a-h may be included in other embodiments. The system 100 may further include a secondary storage 106 to store memory content from DRAM 108 during the sleep phase, as described herein.

Various embodiments describe an apparatus to save power/energy consumed by all valid wake sources housed in a portable electronic system that is powered by a battery (e.g., laptop). Here, for description purposes, a laptop is used as a reference system, however, the embodiments are applicable to any battery-driven portable device such as a mobile phone, tablet, etc.

In a laptop there are many wake sources, such as a fingerprint sensor, keyboard, touchpad, etc. and the number of wake sources in a system are increasing over time. In prior laptops, when the laptop is in sleep state, then these wake sources remain in active state because the wake sources look for changes/interrupts from the environment. These wakeup sources consume energy as illustrated in Table 1, discussed above. The same applies for memory, also depicted in Table 1. During the sleep state, program/data resides in DRAM and requires periodic refresh, so memory also consumes a considerable amount of energy.

Various embodiments keep these wake sources in sleep state, except for a master wake source. The master wake source remains in powered on state and brings other wake sources up (active state), when it detects a presence of a registered user (or when the registered user is approaching towards the system). The apparatus detects the presence of the registered user within a specified distance around the laptop periphery or it also detects when the registered user is approaching towards the laptop.

In some embodiments, the apparatus comprises a Bluetooth Low Energy (BT LE) device in the laptop, which scans the Bluetooth beacon coming from a specific registered user mobile device (e.g., with specified MAC address) and detects the user distance. The apparatus may infer when the registered user is approaching towards the laptop based on the detected user distance. Here, registered user or registered user mobile device are interchangeably used. Once the apparatus finds that the registered user is approaching towards the laptop or the registered user is already in the proximity, then it wakes up the other wake sources from low power mode (e.g., sleep) to active state and/or initiates memory restoration from a secondary storage to the random access memory (RAM).

In some embodiments, the master wake source controls the other wake-source devices' entry and exit into low power mode. For a walking speed of a registered user at 5 kilometers per hour (kmph) and BL LE detection range of 10 meters then the system would have 13.8 seconds ((5000/3600)*10) of time to restore wake sources and memory. This time is enough to restore memory. Normally, about 3 seconds of time is sufficient to restore memory.

The BT LE hardware of various embodiments consumes low power (e.g., 0.01 W), is low cost (e.g., less than $0.5) and small in size. In some embodiments, a user mobile device is used to track presence of user. The mobile device can be a wearable device. Examples of the mobile device used as a registered user include a mobile phone, smart watch, health sensor, game console, etc. Most mobile devices today already have Bluetooth LE as an included feature. So, no extra cost is incurred on the mobile device side for a registered user.

In various embodiments, the reference system (e.g., laptop) scans the BT LE beacon from the mobile BT. The various embodiments may not need pairing of two BT devices, as it may be energy expensive and difficult to pair always. However, pairing can be used (e.g., if a user prefers it). In various embodiments, a MAC address of a user mobile device is used for authenticating a user. The laptop BT scans the BT signal from that specific MAC address BT device. The power consumed by the BT LE device for periodic scanning is low (e.g., two years with a coin battery). In some embodiments, the laptop BT LE device uses the power from a coin battery or another supplemental battery in laptop (e.g., same used for real-time clock (RTC)).

The maximum range of BT LE is 100 meters. However, the signal strength (e.g., received signal strength indicator (RSSI) value) decreases with increased distance. Accordingly, the device may detect the distance of the user based on the signal strength (e.g., RSSI value) of the BT signal. Any suitable peripheral radius may be used. For example, the peripheral radius may be set to 10 meters which corresponds to a RSSI value of −70 dBm. In some embodiments, the peripheral radius and/or associated threshold may be a programmable value that can be set by a user. In this example, if the scanned RSSI value of the mobile device (e.g., with the specified MAC address) is greater than −70 dBm then it does not take any effect as the user is nearby. So, in that condition, the system functions as normal. But, when the BT LE detects the RSSI less than −70 dBm (e.g., for a certain number of scans), then it puts the other wake sources in the laptop to sleep and/or stores the DRAM content to main memory and stops refreshing the DRAM content. The BT LE in the laptop keeps on scanning the presence of the mobile BT LE signal and if it detects the user presence again (e.g., RSSI greater than −70 dBm), then it will wake all the other wake sources and/or restore the saved memory content. The wake and restore operations may be performed within a specific time period (e.g., 13.8 seconds as mentioned earlier). In some embodiments, different thresholds may be used for entering and exiting sleep state, e.g., to avoid hysteresis.

Figure 2:
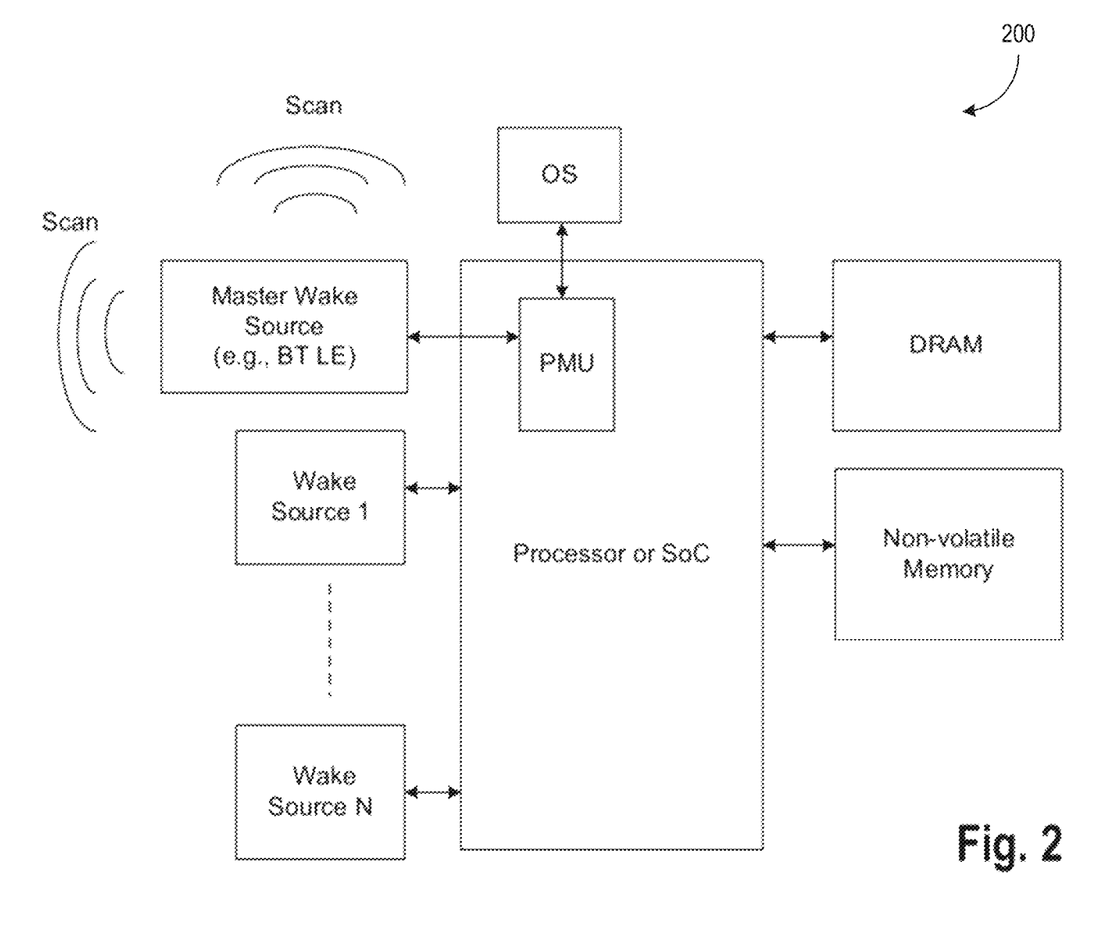
FIG. 2 illustrates a processor system with master wake source to implement the power savings in low power mode, in accordance with some embodiments.

FIG. 2 illustrates a processor system 200 with master wake source to implement the power savings in low power mode, in accordance with some embodiments. The processor system comprises wake sources 1 through N. These wake sources can be fingerprint sensor, touchpad, touch screen, peripheral devices (e.g., universal serial bus devices) etc. the processor or SoC can any suitable processor. One such example is described with reference to FIG. 4. In some embodiments, the master wake source is a BT LE device in a BT modem. The BT modem may be integrated within the SoC, in some embodiments. In some embodiments, the processor and/or operating system communicates with the BT modem and assigns it as the master wake source. As a master wake source, when the processor and/or OS (through ACPI or any suitable interface) puts the processor system in low power state (e.g., SOix) state, then the processor and/or OS puts all wake sources (1 though N) to low power state (e.g., sleep state) but keeps the master wake source powered on. The master wake source then scans for an authenticated user. The authenticated user can be any wearable device. This wearable device need not be paired with the master wake source, in some embodiments. When the processor and/or OS devices to put all wake sources in low power state, it may also transfer data stored in the DRAM to a non-volatile memory. This is done to save the refresh power needed to run refresh cycles on the DRAM.

The scan signal from the master wake source are any suitable low power signals that detect the proximity of an authenticated user. If the authenticated user is within the proximity of the processor system, as determined by the master wake source, the power management unit (PMU) of the processor, and/or the OS, memory contents from the non-volatile memory is moved to the DRAM, and all wake sources are put in active state. In some embodiments, the OS also downloads emails or retrieves other information (e.g., calendar updates, notifications such as push notifications, etc.) before the authenticated user arrives at the processor system to use the processor system.

Figure 3:
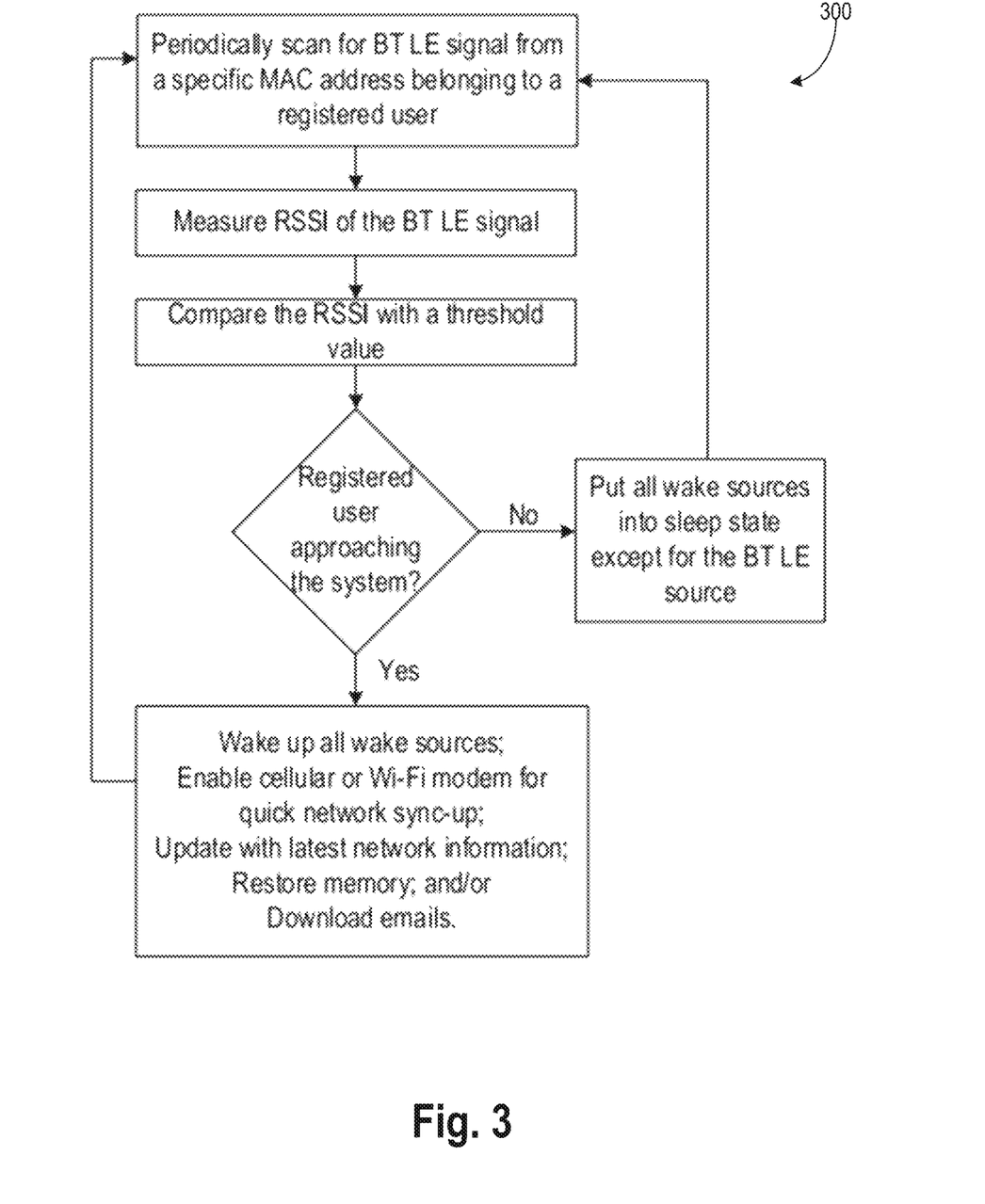
FIG. 3 illustrates a flowchart of a scheme for controlling wake sources in a system to reduce power consumption in sleep state, in accordance with some embodiments.

FIG. 3 illustrates a flowchart of a scheme 300 for controlling wake sources in a system to reduce power consumption in sleep state, in accordance with some embodiments. While the blocks are illustrated in a particular sequence, the sequence can be modified. For example, some blocks can be performed before others, while some blocks can be performed simultaneously with other blocks.

After assigning a master wake source from among the wake sources, the master wake source (here a BT LE device) periodically scans for BT LE signal from a specific mobile device. The specific mobile device is specified by a MAC address. The MAC address is used for user authentication. This allows the apparatus to take one or more actions based on an authenticated user (with a known MAC address).

From the scanned signal, the apparatus measures the RSSI of the signal. The RSSI is an estimated measure of power level that a radio frequency (RF) client device (e.g., BT LE) is receiving (e.g., from an access point or router or mobile device). At larger distances, the signal gets weaker and the wireless data rates get slower, leading to a lower overall data throughput.

The RSSI is compared with a threshold (e.g., a programmable or fixed threshold). Based on the comparison, a determination is made regarding whether the user (e.g., mobile device with specific MAC address) is approaching the system (having the BT LE apparatus). Based on the comparison result, the BT LE apparatus of the system detects whether the mobile device (e.g., authenticated user) is in the vicinity or has gone out of range or approaching towards the laptop that has the BT LE apparatus. If the user is moving away from the laptop (or is outside the range of the BT LE device as determined by the RSSI), then the laptop puts all wake source into sleep state except the BT LE source (e.g., the master wake source). If the user is moving towards the laptop, the laptop causes all wake sources to wake up. In some embodiments, the laptop restores the memory which stored data moved from the DRAM during the laptop sleep state or low power state. The time it takes to wake up the resources (and to restore the memory contents) is less than the time taken by the user to reach the system from the time of detection.

The various actions, performed by the laptop, such as putting the wake sources to sleep or low power state and/or waking them up from low power state to active state may be performed by any suitable logic of the laptop of coupled to the laptop. For example, a power management unit may take the actions of waking up the wake sources and putting them to sleep. In some embodiments, an operating system manages the power state of the wake sources via the ACPI. In some embodiments, the actions taken by the laptop are performed by hardware, software, or a combination of hardware and software.

While the various embodiments are illustrated using BT LE device as the master wake source, it can be replaced with other similar technologies. For example, wireless connectivity circuitries (or wireless interface) including personal area networks (such as Bluetooth, Near Field, etc.), local area networks (such as Wi-Fi), and/or wide area networks (such as WiMax), and/or other wireless communication may be used for scanning the authenticated user.

The flowchart of FIG. 3 can be performed partially or wholly by software providing in a machine-readable storage medium (e.g., memory). The software is stored as computer-executable instructions (e.g., instructions to implement any other processes discussed herein). Program software code/instructions associated with the flowchart (and/or various embodiments) and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with flowchart (and/or various embodiments) are executed by the processor system.

In some embodiments, the program software code/instructions associated with the flowchart (and/or various embodiments) are stored in a computer executable storage medium and executed by the processor. Here, the computer executable storage medium is a tangible machine readable medium that can be used to store program software code/instructions and data that, when executed by a computing device, causes one or more processors to perform a method(s) as may be recited in one or more accompanying claims directed to the disclosed subject matter.

The tangible machine-readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in the same communication session.

The software program code/instructions (associated with the flowchart and other embodiments) and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of the tangible computer-readable media include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, tangible machine readable medium includes any tangible mechanism that provides (e.g., stores and/or transmits in digital form, e.g., data packets) information in a form accessible by a machine (e.g., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, Blackberry® Droid®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

Figure 4:
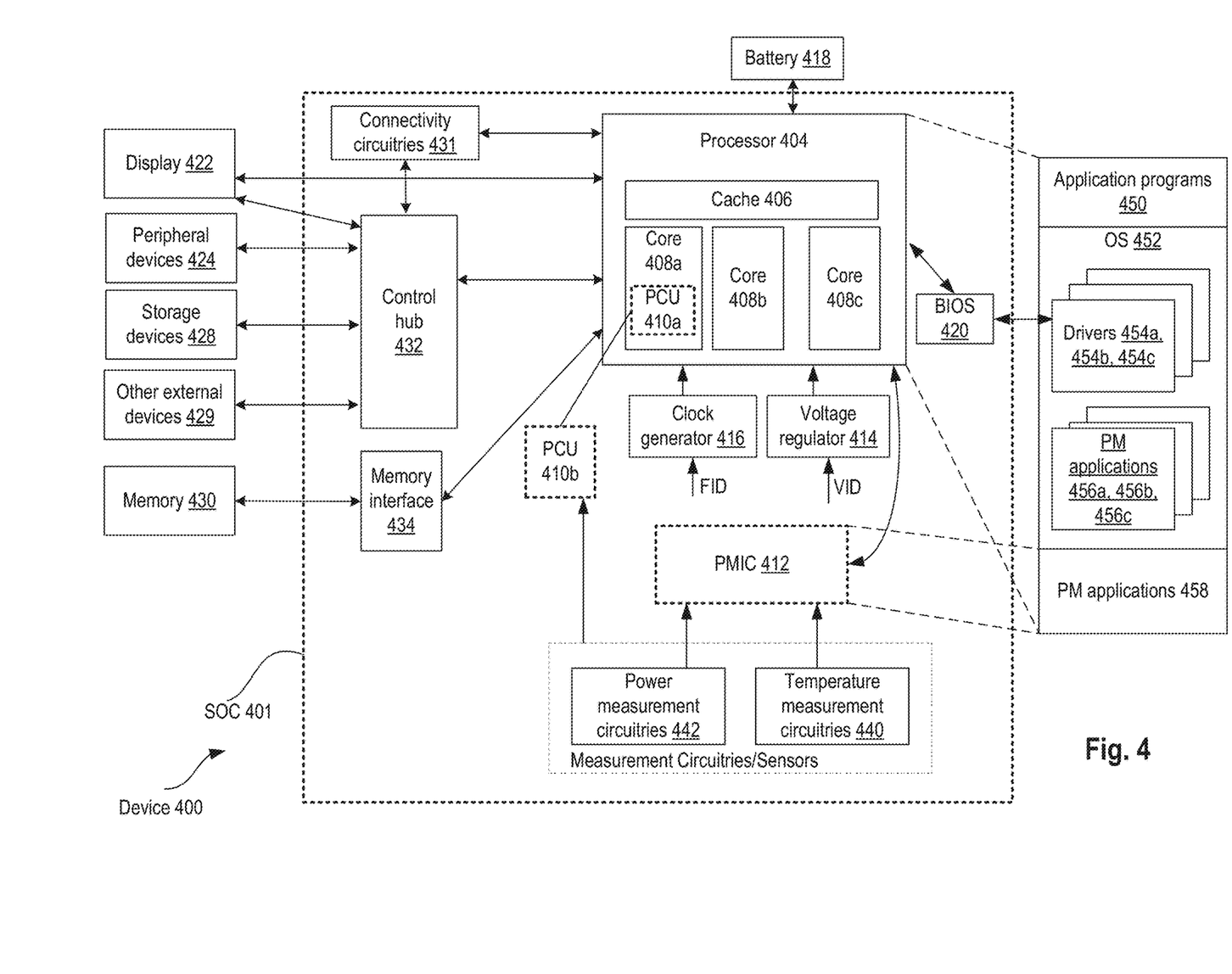
FIG. 4 illustrates a smart device or a computer system or a System-on-Chip (SoC) with apparatus and/or software for controlling wake sources in a system to reduce power consumption in sleep state, in accordance with some embodiments.

FIG. 4 illustrates a smart device or a computer system or a SoC (System-on-Chip) with apparatus and/or software for controlling wake sources in a system to reduce power consumption in sleep state, in accordance with some embodiments.

In some embodiments, device 400 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 400. The apparatus and/or software for controlling wake sources in a system to reduce power consumption in sleep state can be in the wireless connectivity circuitries 431, PCU 410, and/or other logic blocks (e.g., operating system 452) that can manage power for the computer system.

In an example, the device 400 comprises an SoC (System-on-Chip) 401. An example boundary of the SoC 401 is illustrated using dotted lines in FIG. 4, with some example components being illustrated to be included within SoC 401—however, SoC 401 may include any appropriate components of device 400.

In some embodiments, device 400 includes processor 404. Processor 404 can include one or more physical devices, such as microprocessors, application processors, microcontrollers, programmable logic devices, processing cores, or other processing means. The processing operations performed by processor 404 include the execution of an operating platform or operating system on which applications and/or device functions are executed. The processing operations include operations related to I/O (input/output) with a human user or with other devices, operations related to power management, operations related to connecting computing device 400 to another device, and/or the like. The processing operations may also include operations related to audio I/O and/or display I/O.

In some embodiments, processor 404 includes multiple processing cores (also referred to as cores) 408a, 408b, 408c. Although merely three cores 408a, 408b, 408c are illustrated in FIG. 4, processor 404 may include any other appropriate number of processing cores, e.g., tens, or even hundreds of processing cores. Processor cores 408a, 408b, 408c may be implemented on a single integrated circuit (IC) chip. Moreover, the chip may include one or more shared and/or private caches, buses or interconnections, graphics and/or memory controllers, or other components.

In some embodiments, processor 404 includes cache 406. In an example, sections of cache 406 may be dedicated to individual cores 408 (e.g., a first section of cache 406 dedicated to core 408a, a second section of cache 406 dedicated to core 408b, and so on). In an example, one or more sections of cache 406 may be shared among two or more of cores 408. Cache 406 may be split in different levels, e.g., level 1 (L1) cache, level 2 (L2) cache, level 3 (L3) cache, etc.

In some embodiments, processor core 404 may include a fetch unit to fetch instructions (including instructions with conditional branches) for execution by the core 404. The instructions may be fetched from any storage devices such as the memory 430. Processor core 404 may also include a decode unit to decode the fetched instruction. For example, the decode unit may decode the fetched instruction into a plurality of micro-operations. Processor core 404 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.).

The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 404 may be an out-of-order processor core in one embodiment. Processor core 404 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 404 may also include a bus unit to enable communication between components of processor core 404 and other components via one or more buses. Processor core 404 may also include one or more registers to store data accessed by various components of the core 404 (such as values related to assigned app priorities and/or sub-system states (modes) association.

In some embodiments, device 400 comprises connectivity circuitries 431. For example, connectivity circuitries 431 includes hardware devices (e.g., wireless and/or wired connectors and communication hardware) and/or software components (e.g., drivers, protocol stacks), e.g., to enable device 400 to communicate with external devices. Device 400 may be separate from the external devices, such as other computing devices, wireless access points or base stations, etc.

In an example, connectivity circuitries 431 may include multiple different types of connectivity. To generalize, the connectivity circuitries 431 may include cellular connectivity circuitries, wireless connectivity circuitries, etc. Cellular connectivity circuitries of connectivity circuitries 431 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 431 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 431 may include a network interface, such as a wired or wireless interface, e.g., so that a system embodiment may be incorporated into a wireless device, for example, a cell phone or personal digital assistant.

In some embodiments, device 400 comprises control hub 432, which represents hardware devices and/or software components related to interaction with one or more I/O devices. For example, processor 404 may communicate with one or more of display 422, one or more peripheral devices 424, storage devices 428, one or more other external devices 429, etc., via control hub 432. Control hub 432 may be a chipset, a Platform Control Hub (PCH), and/or the like.

For example, control hub 432 illustrates one or more connection points for additional devices that connect to device 400, e.g., through which a user might interact with the system. For example, devices (e.g., devices 429) that can be attached to device 400 include microphone devices, speaker or stereo systems, audio devices, video systems or other display devices, keyboard or keypad devices, or other I/O devices for use with specific applications such as card readers or other devices.

As mentioned above, control hub 432 can interact with audio devices, display 422, etc. For example, input through a microphone or other audio device can provide input or commands for one or more applications or functions of device 400. Additionally, audio output can be provided instead of, or in addition to display output. In another example, if display 422 includes a touch screen, display 422 also acts as an input device, which can be at least partially managed by control hub 432. There can also be additional buttons or switches on computing device 400 to provide I/O functions managed by control hub 432. In one embodiment, control hub 432 manages devices such as accelerometers, cameras, light sensors or other environmental sensors, or other hardware that can be included in device 400. The input can be part of direct user interaction, as well as providing environmental input to the system to influence its operations (such as filtering for noise, adjusting displays for brightness detection, applying a flash for a camera, or other features).

In some embodiments, control hub 432 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 422 represents hardware (e.g., display devices) and software (e.g., drivers) components that provide a visual and/or tactile display for a user to interact with device 400. Display 422 may include a display interface, a display screen, and/or hardware device used to provide a display to a user. In some embodiments, display 422 includes a touch screen (or touch pad) device that provides both output and input to a user. In an example, display 422 may communicate directly with the processor 404. Display 422 can be one or more of an internal display device, as in a mobile electronic device or a laptop device or an external display device attached via a display interface (e.g., DisplayPort, etc.). In one embodiment display 422 can be a head mounted display (HMD) such as a stereoscopic display device for use in virtual reality (VR) applications or augmented reality (AR) applications.

In some embodiments, and although not illustrated in the figure, in addition to (or instead of) processor 404, device 400 may include Graphics Processing Unit (GPU) comprising one or more graphics processing cores, which may control one or more aspects of displaying contents on display 422.

Control hub 432 (or platform controller hub) may include hardware interfaces and connectors, as well as software components (e.g., drivers, protocol stacks) to make peripheral connections, e.g., to peripheral devices 424.

It will be understood that device 400 could both be a peripheral device to other computing devices, as well as have peripheral devices connected to it. Device 400 may have a "docking" connector to connect to other computing devices for purposes such as managing (e.g., downloading and/or uploading, changing, synchronizing) content on device 400. Additionally, a docking connector can allow device 400 to connect to certain peripherals that allow computing device 400 to control content output, for example, to audiovisual or other systems.

In addition to a proprietary docking connector or other proprietary connection hardware, device 400 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 431 may be coupled to control hub 432, e.g., in addition to, or instead of, being coupled directly to the processor 404. In some embodiments, display 422 may be coupled to control hub 432, e.g., in addition to, or instead of, being coupled directly to processor 404.

In some embodiments, device 400 comprises memory 430 coupled to processor 404 via memory interface 434. Memory 430 includes memory devices for storing information in device 400.

In some embodiments, memory 430 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 430 can be a dynamic random-access memory (DRAM) device, a static random-access memory (SRAM) device, flash memory device, phase-change memory device, or some other memory device having suitable performance to serve as process memory. In one embodiment, memory 430 can operate as system memory for device 400, to store data and instructions for use when the one or more processors 404 executes an application or process. Memory 430 can store application data, user data, music, photos, documents, or other data, as well as system data (whether long-term or temporary) related to the execution of the applications and functions of device 400.

Elements of various embodiments and examples are also provided as a machine-readable medium (e.g., memory 430) for storing the computer-executable instructions (e.g., instructions to implement any other processes discussed herein). The machine-readable medium (e.g., memory 430) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 400 comprises temperature measurement circuitries 440, e.g., for measuring temperature of various components of device 400. In an example, temperature measurement circuitries 440 may be embedded, or coupled or attached to various components, whose temperature are to be measured and monitored. For example, temperature measurement circuitries 440 may measure temperature of (or within) one or more of cores 408a, 408b, 408c, voltage regulator 414, memory 430, a mother-board of SoC 401, and/or any appropriate component of device 400.

In some embodiments, device 400 comprises power measurement circuitries 442, e.g., for measuring power consumed by one or more components of the device 400. In an example, in addition to, or instead of, measuring power, the power measurement circuitries 442 may measure voltage and/or current. In an example, the power measurement circuitries 442 may be embedded, or coupled or attached to various components, whose power, voltage, and/or current consumption are to be measured and monitored. For example, power measurement circuitries 442 may measure power, current and/or voltage supplied by one or more voltage regulators 414, power supplied to SoC 401, power supplied to device 400, power consumed by processor 404 (or any other component) of device 400, etc.

In some embodiments, device 400 comprises one or more voltage regulator circuitries, generally referred to as voltage regulator (VR) 414. VR 414 generates signals at appropriate voltage levels, which may be supplied to operate any appropriate components of the device 400. Merely as an example, VR 414 is illustrated to be supplying signals to processor 404 of device 400. In some embodiments, VR 414 receives one or more Voltage Identification (VID) signals, and generates the voltage signal at an appropriate level, based on the VID signals. Various type of VRs may be utilized for the VR 414. For example, VR 414 may include a "buck" VR, "boost" VR, a combination of buck and boost VRs, low dropout (LDO) regulators, switching DC-DC regulators, constant-on-time controller-based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 410a/b and/or PMIC 412. In some embodiments, each core has a network of distributed LDOs to provide efficient control for power management. The LDOs can be digital, analog, or a combination of digital or analog LDOs. In some embodiments, VR 414 includes current tracking apparatus to measure current through power supply rail(s).

In some embodiments, device 400 comprises one or more clock generator circuitries, generally referred to as clock generator 416. Clock generator 416 generates clock signals at appropriate frequency levels, which may be supplied to any appropriate components of device 400. Merely as an example, clock generator 416 is illustrated to be supplying clock signals to processor 404 of device 400. In some embodiments, clock generator 416 receives one or more Frequency Identification (FID) signals, and generates the clock signals at an appropriate frequency, based on the FID signals.

In some embodiments, device 400 comprises battery 418 supplying power to various components of device 400. Merely as an example, battery 418 is illustrated to be supplying power to processor 404. Although not illustrated in the figures, device 400 may comprise a charging circuitry, e.g., to recharge the battery, based on Alternating Current (AC) power supply received from an AC adapter.

In some embodiments, device 400 comprises Power Control Unit (PCU) 410 (also referred to as Power Management Unit (PMU), Power Controller, etc.). In an example, some sections of PCU 410 may be implemented by one or more processing cores 408, and these sections of PCU 410 are symbolically illustrated using a dotted box and labelled PCU 410a. In an example, some other sections of PCU 410 may be implemented outside the processing cores 408, and these sections of PCU 410 are symbolically illustrated using a dotted box and labelled as PCU 410b. PCU 410 may implement various power management operations for device 400. PCU 410 may include hardware interfaces, hardware circuitries, connectors, registers, etc., as well as software components (e.g., drivers, protocol stacks), to implement various power management operations for device 400.

In some embodiments, device 400 comprises Power Management Integrated Circuit (PMIC) 412, e.g., to implement various power management operations for device 400. In some embodiments, PMIC 412 is a Reconfigurable Power Management ICs (RPMICs) and/or an IMVP (Intel® Mobile Voltage Positioning). In an example, the PMIC is within an IC chip separate from processor 404. The may implement various power management operations for device 400. PMIC 412 may include hardware interfaces, hardware circuitries, connectors, registers, etc., as well as software components (e.g., drivers, protocol stacks), to implement various power management operations for device 400.

In an example, device 400 comprises one or both PCU 410 or PMIC 412. In an example, any one of PCU 410 or PMIC 412 may be absent in device 400, and hence, these components are illustrated using dotted lines.

Various power management operations of device 400 may be performed by PCU 410, by PMIC 412, or by a combination of PCU 410 and PMIC 412. For example, PCU 410 and/or PMIC 412 may select a power state (e.g., P-state) for various components of device 400. For example, PCU 410 and/or PMIC 412 may select a power state (e.g., in accordance with the ACPI (Advanced Configuration and Power Interface) specification) for various components of device 400. Merely as an example, PCU 410 and/or PMIC 412 may cause various components of the device 400 to transition to a sleep state, to an active state, to an appropriate C state (e.g., C0 state, or another appropriate C state, in accordance with the ACPI specification), etc. In an example, PCU 410 and/or PMIC 412 may control a voltage output by VR 414 and/or a frequency of a clock signal output by the clock generator, e.g., by outputting the VID signal and/or the FID signal, respectively. In an example, PCU 410 and/or PMIC 412 may control battery power usage, charging of battery 418, and features related to power saving operation.

The clock generator 416 can comprise a phase locked loop (PLL), frequency locked loop (FLL), or any suitable clock source. In some embodiments, each core of processor 404 has its own clock source. As such, each core can operate at a frequency independent of the frequency of operation of the other core. In some embodiments, PCU 410 and/or PMIC 412 performs adaptive or dynamic frequency scaling or adjustment. For example, clock frequency of a processor core can be increased if the core is not operating at its maximum power consumption threshold or limit. In some embodiments, PCU 410 and/or PMIC 412 determines the operating condition of each core of a processor, and opportunistically adjusts frequency and/or power supply voltage of that core without the core clocking source (e.g., PLL of that core) losing lock when the PCU 410 and/or PMIC 412 determines that the core is operating below a target performance level. For example, if a core is drawing current from a power supply rail less than a total current allocated for that core or processor 404, then PCU 410 and/or PMIC 412 can temporality increase the power draw for that core or processor 404 (e.g., by increasing clock frequency and/or power supply voltage level) so that the core or processor 404 can perform at higher performance level. As such, voltage and/or frequency can be increased temporality for processor 404 without violating product reliability.

In an example, PCU 410 and/or PMIC 412 may perform power management operations, e.g., based at least in part on receiving measurements from power measurement circuitries 442, temperature measurement circuitries 440, charge level of battery 418, and/or any other appropriate information that may be used for power management. To that end, PMIC 412 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 410 and/or PMIC 412 in at least one embodiment to allow PCU 410 and/or PMIC 412 to manage processor core energy at least in part based on value(s) detected by one or more of the sensors.

Also illustrated is an example software stack of device 400 (although not all elements of the software stack are illustrated). Merely as an example, processors 404 may execute application programs 450, Operating System 452, one or more Power Management (PM) specific application programs (e.g., generically referred to as PM applications 458), and/or the like. PM applications 458 may also be executed by the PCU 410 and/or PMIC 412. OS 452 may also include one or more PM applications 456a, 456b, 456c. The OS 452 may also include various drivers 454a, 454b, 454c, etc., some of which may be specific for power management purposes. In some embodiments, device 400 may further comprise a Basic Input/output System (BIOS) 420. BIOS 420 may communicate with OS 452 (e.g., via one or more drivers 454), communicate with processors 404, etc.

For example, one or more of PM applications 458, 456, drivers 454, BIOS 420, etc. may be used to implement power management specific tasks, e.g., to control voltage and/or frequency of various components of device 400, to control wake-up state, sleep state, and/or any other appropriate power state of various components of device 400, control battery power usage, charging of the battery 418, features related to power saving operation, etc.

In some embodiments, battery 418 is a Li-metal battery with a pressure chamber to allow uniform pressure on a battery. The pressure chamber is supported by metal plates (such as pressure equalization plate) used to give uniform pressure to the battery. The pressure chamber may include pressured gas, elastic material, spring plate, etc. The outer skin of the pressure chamber is free to bow, restrained at its edges by (metal) skin, but still exerts a uniform pressure on the plate that is compressing the battery cell. The pressure chamber gives uniform pressure to battery, which is used to enable high-energy density battery with, for example, 20% more battery life.

In some embodiments, pCode executing on PCU 410a/b has a capability to enable extra compute and telemetries resources for the runtime support of the pCode. Here pCode refers to a firmware executed by PCU 410a/b to manage performance of the SoC 401. For example, pCode may set frequencies and appropriate voltages for the processor. Part of the pCode are accessible via OS 452. In various embodiments, mechanisms and methods are provided that dynamically change an Energy Performance Preference (EPP) value based on workloads, user behavior, and/or system conditions. There may be a well-defined interface between OS 452 and the pCode. The interface may allow or facilitate the software configuration of several parameters and/or may provide hints to the pCode. As an example, an EPP parameter may inform a pCode algorithm as to whether performance or battery life is more important.

This support may be done as well by the OS 452 by including machine-learning support as part of OS 452 and either tuning the EPP value that the OS hints to the hardware (e.g., various components of SoC 401) by machine-learning prediction, or by delivering the machine-learning prediction to the pCode in a manner similar to that done by a Dynamic Tuning Technology (DTT) driver. In this model, OS 452 may have visibility to the same set of telemetries as are available to a DTT. As a result of a DTT machine-learning hint setting, pCode may tune its internal algorithms to achieve optimal power and performance results following the machine-learning prediction of activation type. The pCode as example may increase the responsibility for the processor utilization change to enable fast response for user activity, or may increase the bias for energy saving either by reducing the responsibility for the processor utilization or by saving more power and increasing the performance lost by tuning the energy saving optimization. This approach may facilitate saving more battery life in case the types of activities enabled lose some performance level over what the system can enable. The pCode may include an algorithm for dynamic EPP that may take the two inputs, one from OS 452 and the other from software such as DTT, and may selectively choose to provide higher performance and/or responsiveness. As part of this method, the pCode may enable in the DTT an option to tune its reaction for the DTT for different types of activity.

Some non-limiting Examples of various embodiments are presented below.

Example 1 is one or more non-transitory computer-readable media (NTCRM) having instructions, stored thereon, that when executed cause one or more processors to: scan, using a master wake source, for a signal from a mobile device with a specific media access control (MAC) address; measure a received signal strength indicator (RSSI) of the signal; compare the RSSI with a threshold that corresponds to a proximity range; determine that the mobile device is outside the proximity range based on the comparison; and transition one or more wake sources in a low power state based on the determination, wherein the master wake source remains in a powered on state while the one or more wake sources are in the low power state.

Example 2 is the one or more NTCRM of Example 1, wherein the scan is performed periodically.

Example 3 is the one or more NTCRM of Example 1, wherein the signal is a first signal and the RSSI is a first RSSI, and wherein the instructions, when executed, are further to cause the one or more processors to: measure a second RSSI of a second signal from the mobile device; determine that the mobile device is within the proximity range based on the second RSSI; and transition the one or more wake sources to the powered on state based on the determination that the mobile device is within the proximity range.

Example 4 is the one or more NTCRM of Example 3, wherein the instructions, when executed, are further to cause the one or more processors to download one or more emails, notifications, or calendar updates based on the determination that the mobile device is within the proximity range.

Example 5 is the one or more NTCRM of Example 1, wherein the instructions, when executed, are further to cause the one or more processors to, based on the determination: save memory content from a dynamic random access memory (DRAM) to a non-volatile memory; and stop refreshes of the DRAM.

Example 6 is the one or more NTCRM of Example 5, wherein the signal is a first signal and the RSSI is a first RSSI, and wherein the instructions, when executed, are further to cause the one or more processors to: measure a second RSSI of a second signal from the mobile device; determine that the mobile device is within the proximity range based on the second RSSI; and transition the one or more wake sources to the powered on state and restore the memory content to the DRAM based on the determination that the mobile device is within the proximity range.

Example 7 is the one or more NTCRM of any of Examples 1-6, wherein the signal is a Bluetooth Low Energy (BT LE) signal.

Example 8 is the one or more NTCRM of any of Examples 1-7, wherein the mobile device is not paired with the one or more processors during the scan and measurement.

Example 9 is the one or more NTCRM of any of Examples 1-8, wherein the threshold is programmable.

Example 10 is an integrated circuit comprising: a processor; a master wake source coupled to the processor; and logic coupled to the master wake source. The logic is to: scan for a scan signal from a mobile device with a specific media access control (MAC) address; determine that a signal strength of the scan signal is less than a threshold or that the scan signal is not detected; and transition one or more other wake sources to a low power state based on the determination, wherein the master wake source remains in a powered on state while the one or more other wake sources are in the low power state.

Example 11 is the integrated circuit of Example 10, wherein the logic is to perform the scan periodically.

Example 12 is the integrated circuit of Example 10, wherein the signal is a first signal and the signal strength is a first signal strength, and wherein the logic is further to: determine that a second signal strength of a second scan signal from the mobile device is greater than the threshold or another threshold; and transition the one or more wake sources to the powered on state based on the determination that the second signal strength is greater than the threshold or another threshold.

Example 13 is the integrated circuit of Example 12, wherein the logic is further to, based on the determination: save memory content from a first memory to a second memory; and stop refreshes of the first memory.

Example 14 is the integrated circuit of Example 13, wherein the signal is a first signal and the signal strength is a first signal strength, and wherein the logic is further to: determine that a second signal strength of a second scan signal from the mobile device is greater than the threshold or another threshold; and restore the memory content to the first memory based on the determination that the second signal strength is greater than the threshold or the another threshold.

Example 15 is the integrated circuit of any of Examples 10-14, wherein the master wake source is a Bluetooth Low Energy (BT LE) device.

Example 16 is the integrated circuit of any of Examples 10-15, wherein the mobile device is not paired with the integrated circuit during the scan and measurement.

Example 17 is a computer system comprising: a processor; a first memory coupled to the processor; a second memory coupled to the processor; and a plurality of wake sources including a master wake source and one or more other wake sources, wherein the plurality of wake sources can wake up the computer system upon one or more triggers, wherein the master wake source is to periodically scan for a scan signal with a specific MAC address associated with a mobile device. The computer system of Example 17 further comprises logic to: determine that a received signal strength indicator (RSSI) of the scan signal is less than a threshold or that the scan signal with the specific MAC address is not detected; and transfer data from the first memory to the second memory based on the determination.

Example 18 is the computer system of Example 17, wherein the first memory comprises a dynamic random access memory (DRAM), and wherein the second memory comprises a non-volatile memory.

Example 19 is the computer system of Example 17, wherein the scan signal is a first scan signal and the RSSI is a first RSSI, and wherein the logic is further to: determine that a second RSSI of a second scan signal with the specific MAC address is greater than the threshold; and restore the data to the first memory based on the determination that the second RSSI is greater than the threshold or another threshold.

Example 20 is the computer system of Example 19, wherein the logic is further to transition the one or more other wake sources to a low power state based on the determination that the first RSSI is less than the threshold or that the first scan signal with the specific MAC address is not detected.

Example 21 is the computer system of Example 20, wherein the logic is further to transition the one or more other wake sources to a powered on state based on the determination that the second RSSI is greater than the threshold or the another threshold.

Example 22 is the computer system of any of Examples 17-21, wherein the master wake source is a Bluetooth Low Energy (BT LE) device.

Example 23 is the computer system of any of Examples 17-22, wherein the mobile device is not paired with the computer system during the scan and measurement.

Example 24 is the computer system of any of Examples 17-23, wherein the one or more other wake sources include one or more of a touchpad, a fingerprint sensor, a camera, or a microphone.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

The invention claimed is:

1. One or more non-transitory computer-readable media (NTCRM) having instructions, stored thereon, that when executed cause one or more processors to:
   scan, using a first wake source, for a signal from a mobile device with a specific media access control (MAC) address;
   measure a received signal strength indicator (RSSI) of the signal;
   compare the RSSI with a threshold that corresponds to a proximity range;
   determine that the mobile device is outside the proximity range based on the comparison; and
   transition one or more wake sources to a low power state based on the determination, wherein the first wake source remains in a powered on state while the one or more wake sources are in the low power state.

2. The one or more NTCRM of claim 1, wherein the one or more wake sources comprise at least two of a keyboard, a touchpad, a touch screen, and a fingerprint sensor, and wherein the one or more processors are to perform the scan periodically.

3. The one or more NTCRM of claim 1, wherein the signal is a first signal and the RSSI is a first RSSI, and wherein the instructions, when executed, are further to cause the one or more processors to:
   measure a second RSSI of a second signal from the mobile device;
   determine that the mobile device is within the proximity range based on the second RSSI; and
   transition the one or more wake sources to the powered on state based on the determination that the mobile device is within the proximity range.

4. The one or more NTCRM of claim 3, wherein the instructions, when executed, are further to cause the one or more processors to download one or more emails, notifications, or calendar updates based on the determination that the mobile device is within the proximity range.

5. The one or more NTCRM of claim 1, wherein the instructions, when executed, are further to cause the one or more processors to, based on the determination:
  save memory content from a dynamic random access memory (DRAM) to a non-volatile memory; and
  stop refreshes of the DRAM.

6. The one or more NTCRM of claim 5, wherein the signal is a first signal and the RSSI is a first RSSI, and wherein the instructions, when executed, are further to cause the one or more processors to:
  measure a second RSSI of a second signal from the mobile device;
  determine that the mobile device is within the proximity range based on the second RSSI; and
  transition the one or more wake sources to the powered on state and restore the memory content to the DRAM based on the determination that the mobile device is within the proximity range.

7. The one or more NTCRM of claim 1, wherein the signal is a Bluetooth Low Energy (BT LE) signal.

8. The one or more NTCRM of claim 7, wherein the mobile device is not paired with the one or more processors during the scan and measurement.

9. The one or more NTCRM of claim 1, wherein the threshold is programmable.

10. The one or more NTCRM of claim 1, wherein the first wake source is to be powered by a different battery than the one or more wake sources.

11. An integrated circuit comprising:
  a processor;
  a first wake source coupled to the processor; and
  logic coupled to the first wake source, the logic to:
    scan for a scan signal from a mobile device with a specific media access control (MAC) address;
    determine that a signal strength of the scan signal is less than a threshold or that the scan signal is not detected; and
    transition one or more other wake sources to a low power state based on the determination, wherein the first wake source remains in a powered on state while the one or more other wake sources are in the low power state.

12. The integrated circuit of claim 11, wherein the one or more wake sources comprise at least two of a keyboard, a touchpad, a touch screen, and a fingerprint sensor, and wherein the logic is to perform the scan periodically.

13. The integrated circuit of claim 11, wherein the scan signal is a first scan signal and the signal strength is a first signal strength, and wherein the logic is further to:
  determine that a second signal strength of a second scan signal from the mobile device is greater than the threshold or another threshold; and
  transition the one or more other wake sources to the powered on state based on the determination that the second signal strength is greater than the threshold or another threshold.

14. The integrated circuit of claim 13, wherein the logic is further to, based on the determination:
  save memory content from a first memory to a second memory; and
  stop refreshes of the first memory.

15. The integrated circuit of claim 14, wherein the scan signal is a first scan signal and the signal strength is a first signal strength, and wherein the logic is further to:
  determine that a second signal strength of a second scan signal from the mobile device is greater than the threshold or a second threshold; and
  restore the memory content to the first memory based on the determination that the second signal strength is greater than the threshold or the second threshold.

16. The integrated circuit of claim 11, wherein the first wake source is to be powered by a different battery than the one or more wake sources, and wherein the first wake source is a Bluetooth Low Energy (BT LE) device.

17. The integrated circuit of claim 11, wherein the mobile device is not paired with the integrated circuit during the scan and measurement.

18. A computer system comprising:
  a processor;
  a first memory coupled to the processor;
  a second memory coupled to the processor;
  a plurality of wake sources including a first wake source and one or more other wake sources, wherein the plurality of wake sources can wake up the computer system upon one or more triggers, wherein the first wake source is to periodically scan for a scan signal with a specific MAC address associated with a mobile device; and
  logic to:
    determine that a received signal strength indicator (RSSI) of the scan signal is less than a threshold or that the scan signal with the specific MAC address is not detected; and
    transfer data from the first memory to the second memory based on the determination.

19. The computer system of claim 18, wherein the first wake source is to be powered by a different battery than the one or more wake sources, wherein the first memory comprises a dynamic random access memory (DRAM), and wherein the second memory comprises a non-volatile memory.

20. The computer system of claim 18, wherein the scan signal is a first scan signal and the RSSI is a first RSSI, and wherein the logic is further to:
  determine that a second RSSI of a second scan signal with the specific MAC address is greater than the threshold; and
  restore the data to the first memory based on the determination that the second RSSI is greater than the threshold or a second threshold.

21. The computer system of claim 20, wherein the logic is further to transition the one or more other wake sources to a low power state based on the determination that the first RSSI is less than the threshold or that the first scan signal with the specific MAC address is not detected.

22. The computer system of claim 21, wherein the logic is further to transition the one or more other wake sources to a powered on state based on the determination that the second RSSI is greater than the threshold or the another second threshold.

23. The computer system of claim 18, wherein the one or more wake sources comprise at least two of a keyboard, a touchpad, a touch screen, and a fingerprint sensor, and wherein the first wake source is a Bluetooth Low Energy (BT LE) device.

24. The computer system of claim 18, wherein the mobile device is not paired with the computer system during the scan and measurement.

25. The computer system of claim 18, wherein the one or more other wake sources include one or more of a touchpad, a fingerprint sensor, a camera, or a microphone.

* * * * *